Patented Sept. 7, 1926.

1,598,982

UNITED STATES PATENT OFFICE.

CHARL...

COMPOUNDS OF COPPER FOR USE IN COMBATING FUNGI AND THE LIKE.

No Drawing. Application filed October 31, 1923. Serial No. 672,015.

This invention relates to compounds of copper for use in combating fungi and the like, and more particularly to a method of combating deleterious fungi and insect pests, especially the combating of wheat smut through the use in dry form of a basic salt of copper and hydrous copper compounds of great bulk and adhering properties, together with a method of preparing such copper compounds.

An object of the invention is to produce an insecticide and fungicide for the relief of agriculturists who now suffer great loss through the uncertainty of present methods of combating fungi, such as wheat smut.

Present methods of combating fungi consist in the well known use of formaldehyde or copper sulfate or copper sulfate and lime, and consist essentially in dipping the seed grain in solutions of these substances immediately before seeding. By these methods, the seed must be treated immediately before seeding or otherwise the germinating power of the seed is destroyed by any contact with the chemicals used. Under the most favorable conditions, some or all of the grain is ruined and fails to germinate.

By the use of the process forming the subject matter of the present invention, each grain of seed is coated with a firmly adhering layer of a copper compound and this coating may be done at any convenient time or in any convenient manner, usually by rolling the seed grain in a barrel with a copper compound at the rate of from 2 to 4 ounces of the compound to each bushel of seed grain. By this method of treating seed grain, the germinating power of the grain is not affected and a great saving in seed is thus possible.

I am aware that the use of copper carbonate in various forms has been proposed and to some extent, has been used, but on account of the heavy, non-adhering properties of the copper carbonate of commerce, it has never come into general use.

In the present invention, I provide a copper compound of a bulky, sticky character which makes the use of a dry treatment possible.

I have found that copper carbonate may be formed in both heavy and light forms similar to magnesium carbonate. This light copper carbonate or mixture of copper carbonate and copper hydroxide has the desired and necessary properties of bulkiness and ability to adhere to render it useful as an insecticide and fungicide for treating seed grain. The basic salt of copper possesses the bulky properties and stickiness needed to prove effective in wheat treatment.

The bulky copper compound may be formed in various ways but I have found that by treating copper sulfate with milk of lime or sodium hydroxid free from carbonate, a basic salt of copper is formed that is extremely bulky and sticky. When copper sulfate is treated with soda ash, a bulky blue precipitate is formed. By heating this precipitate in its mother liquor to approximately 140° F., a sudden change takes place, the precipitate turning light greenish-blue and becoming slightly less bulky. At this point, the precipitate is immediately removed from the mother liquor and quickly dried. If the temperature is carried too high or the heat treatment continued too long, the blue-green precipitate becomes brown and then black, changing to an oxide. While the exact nature of the bulky copper material formed is unknown, it is believed that the heat brings about a crystallization of the copper carbonate which forms the bulk of the precipitate and at the same time, prevents the formation of double or basic compounds with a copper hydroxide present. Enough hydroxide remains to give the bulky and sticky properties, and the particles of crystalline copper carbonate present prevent the hydroxide particles from forming into a hard mass.

As stated, other methods may be employed in preparing the bulky copper compound and the invention consists essentially in the provision of a copper salt or a mixture containing the copper salt of bulky and adhering nature in which at least 50 per cent of the material is copper, having a bulk of less than 40 pounds per cubic foot, loose packed, and a sticking power to wheat of at least 80 per cent; that is, one gram of the powder when shaken with 125 grams of clean wheat will show at least .8 grams adhering to the wheat grains.

While I have described in detail the preferred practice of my process, it is to be understood that the details of procedure, and proportions of ingredients, may be widely varied and that known chemical equivalents may be employed in place of the materials mentioned, without departing from the spirit of the invention or the scope of the subjoined claims.

Having thus described my invention, I claim:—

1. A fungicide comprising a basic salt of copper of great bulk and adhering power having an apparent specific gravity below 3.7.

2. A fungicide comprising basic salts of copper of great bulk containing more than 50 per cent of copper and weighing less than 40 pounds per cubic foot.

3. The method of making a fungicide which comprises treating a soluble copper salt with a hydroxide, heating the precipitate to substantially 140° F., and drying it.

4. The method of making a fungicide which comprises treating copper sulfate with a hydroxide, heating the precipitate to substantially 140° F., and drying it.

In testimony whereof, I affix my signature.

CHARLES ABBOT NEWHALL.